United States Patent [19]

Wagener

[11] 4,428,844

[45] Jan. 31, 1984

[54] COMPACTED LOST CIRCULATION MATERIAL

[75] Inventor: Anthony P. Wagener, Park Forest, Ill.

[73] Assignee: The Sherwin-Williams Company, Cleveland, Ohio

[21] Appl. No.: 278,793

[22] Filed: Jun. 29, 1981

[51] Int. Cl.$^3$ .............................................. C09K 7/02
[52] U.S. Cl. ............................... 252/8.5 LC; 44/1 D; 44/10 R; 162/100; 162/218; 162/227; 175/72
[58] Field of Search ........................ 252/8.5 LC, 8.5 R; 175/72; 44/1 D, 10 R; 264/115; 162/218, 100, 162/227

[56] References Cited

U.S. PATENT DOCUMENTS

| | | | |
|---|---|---|---|
| 2,064,936 | 12/1936 | McQuiston | 255/1 |
| 2,119,829 | 1/1938 | Parsons | 252/8.5 |
| 2,300,325 | 10/1942 | Van Leeuwen | 61/36 |
| 2,610,149 | 9/1952 | Van Dyke | 252/8.5 |
| 2,793,995 | 5/1957 | Twining | 252/8.5 |
| 2,935,472 | 5/1960 | Klaas et al. | 252/8.5 |
| 3,198,268 | 8/1965 | Lindblom et al. | 175/72 |
| 3,221,825 | 12/1965 | Henderson | 175/72 |
| 3,788,405 | 1/1974 | Taylor | 175/72 |
| 3,928,211 | 2/1975 | Browning et al. | 252/8.5 |
| 3,953,336 | 4/1976 | Daigle | 252/8.5 |
| 4,217,965 | 8/1980 | Cremeans | 175/72 |

*Primary Examiner*—Herbert B. Guynn
*Attorney, Agent, or Firm*—Robert E. McDonald; James V. Tura

[57] ABSTRACT

Disclosed is a compacted paper lost circulation material for use in arresting or preventing a lost circulation condition in well bore drilling operations and a method of forming same. The lost circulation material generally comprises comminuted paper, water and a non-foaming, water soluble surfactant which has been compressed to form a pellet. When added to a circulating drilling fluid, the pellet disperses to form particulate wetted paper which plugs fractured or vugular porosity in an earth stratum which othewise creates a lost circulation condition in the drilling fluid.

15 Claims, 3 Drawing Figures

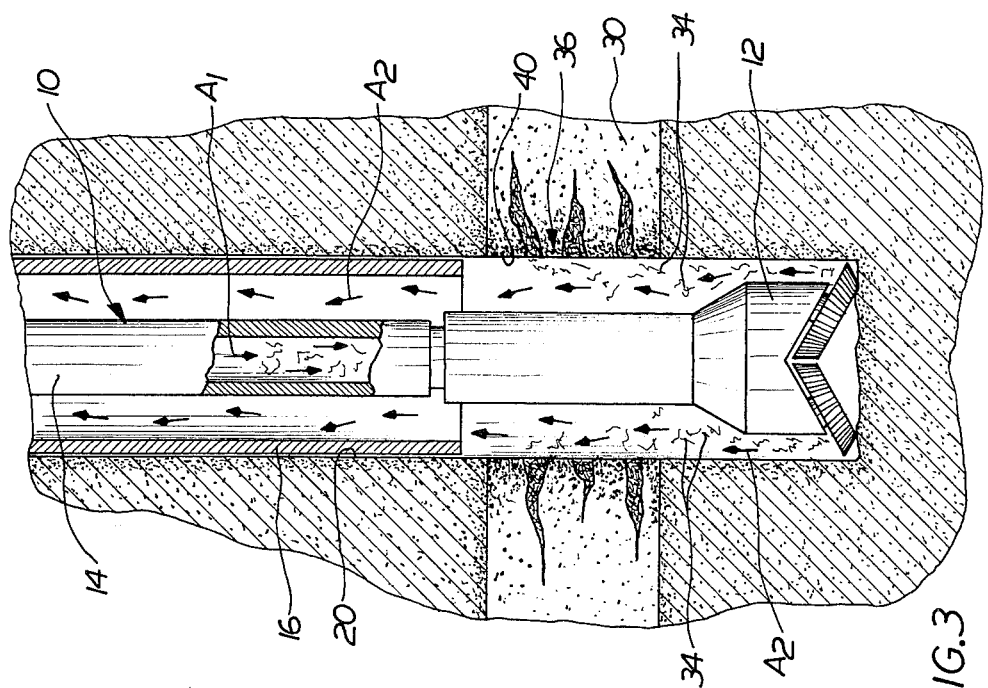
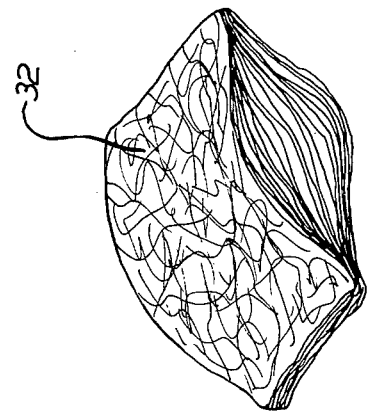
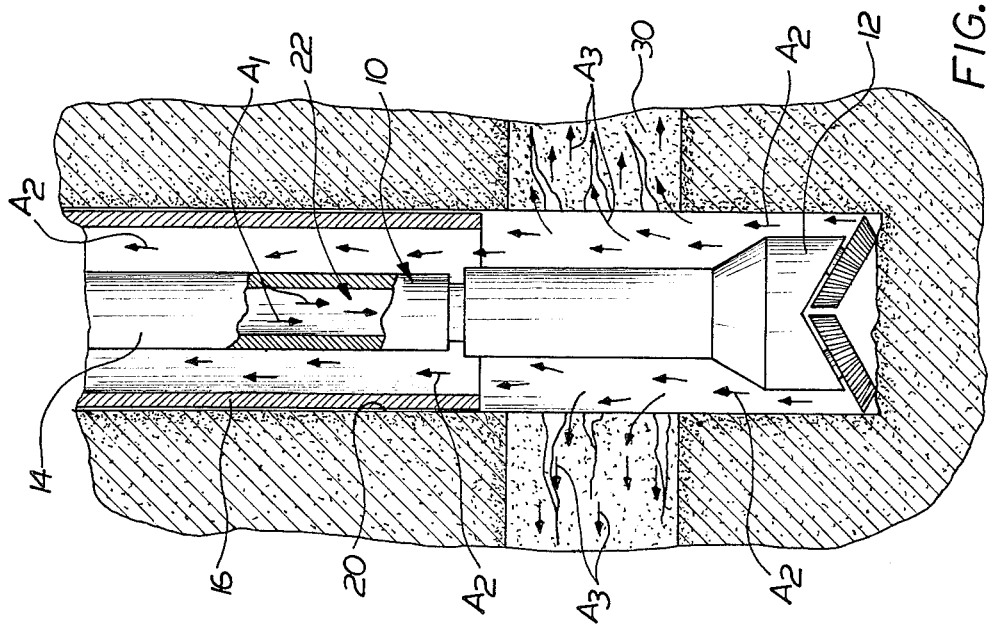

COMPACTED LOST CIRCULATION MATERIAL

BACKGROUND OF THE INVENTION

This invention relates to the art of earth bore hole drilling, and more particularly, to a compacted material which may be added to a drilling fluid to combat or prevent lost circulation of the drilling fluid when porosity, fractures and highly permeable vugular zones in the earth strata are encountered.

In earth hole boring operations such as oil well, gas, mineral, water well drilling and the like, the drilling bit passes through various solid and fractured or vugulated porous earth strata as it descends toward the desired depth. Drilling muds are commonly employed in order to lubricate and cool the drilling bit and act as a transport medium to remove drilled earth solids from the drilling bit and bore hole to the surface. When the drilling bit passes through the porous, fractured or vugular strata such as sand, gravel, shale, limestone and the like, the hydrostatic pressure caused by the vertical column of drilling fluid exceeds the ability of the surrounding earth formation to support this pressure. As a consequence drilling fluid is lost to the formation and fails to return to the surface. This loss may be any fraction up to 100% loss of the total circulating drilling fluid volume. This condition is known in the art as lost circulation.

In order to combat or prevent lost circulation, it has been common in the past to add any number of materials to the drilling fluid which act to reduce or prevent flow of the drilling fluid outwardly in a porous stratum thereby arresting a lost circulation condition. These materials are commonly referred to as lost circulation materials. Such prior, known, lost circulation materials include ground oyster shells, wood fiber, asbestos, chicken feathers, popped popcorn, straw, chopped rope, bark chips, ground cork, ground rubber tires, shaped plastic pellets, ground paper, chopped cellophane, mica, cottonseed hulls and gelling agents such as clay. Each of these materials attacks the problem in a different way such as by physically blocking or bridging the pores as with solid materials such as cork, rubber, plastic, etc., forming a fibrous mat such as with asbestos, straw, rope, etc. and consolidating drilling fluid material within a porous structure such as by gelling or matting with paper and combinations of these actions. While these materials are often quite effective, there is considerable expense involved in transporting, manufacturing and using such materials.

One inexpensive material which has been used is paper. U.S. Pat. No. 2,064,936 discloses the use of a slurry of ground paper as a lost cirulation material. Many problems are associated with the use of paper as a lost circulation material however. Paper does not wet in easily and thus there are problems associated with dispersing paper in a drilling fluid. Also, the bulk density of paper is very low (on the order of two to three pounds per cubic foot) and thus, large amounts, i.e. many truckloads of paper, are needed in order to arrest a single lost circulation condition in a well bore. The low bulk density also creates a wellsite storage problem.

SUMMARY OF THE INVENTION

An improved lost circulation material made in accordance with the invention comprises comminuted paper, preferably newsprint and/or magazines, which has been treated with a solution of water and a surfactant and compressed into dense pellets. The pellets, when added to an aqueous drilling fluid, readily disperse and are available to form a mat over orifices in a porous stratum which reduces fluid seepage after bridging and plugging by other materials until a seal against lost circulation of the drilling fluid is achieved.

In accordance with a furthur aspect of the invention, the aforementioned pellets may further include cubic material such as bark, oyster shells and the like, and/or fibrous material such as wood fiber and the like, to enhance the action of the dispersed comminuted paper.

In yet another aspect of the invention, the pellets may further include biocides, viscosifiers, corrosion inhibitors and the like to provide a multi-functional lost circulation material in a drilling mud.

It is therefore an object of this invention to provide a pellet for use in arresting or preventing lost circulation in drilling fluids which utilizes inexpensive ground paper and avoids the problems of low bulk density and poor wettability of prior downwell paper products used to arrest or prevent lost circulation.

It is another object of this invention to provide a process for forming a compacted ground paper lost circulation material which, when added to a drilling fluid, quickly disperses to plug a porous stratum.

It is yet another object of this invention to provide a compacted paper pellet which may be used in conjunction with, or is actually compacted with other lost circulation materials, viscosifiers and the like.

BRIEF DESCRIPTION OF THE DRAWINGS

These and other objects of the invention will appear through the understanding of a more detailed description of a preferred embodiment of the invention which shall be illustrated hereinafter and in conjunction with the accompanying drawings forming a part of this specification and in which:

FIG. 1 is a cross-sectional side-elevational view of a well bore illustrating a lost circulation condition;

FIG. 2 is a perspective view of a lost circulation material pellet in accordance with this invention, and FIG. 3 is a view similar to FIG. 1 showing the use of the pellets of FIG. 2 to arrest a lost circulation condition.

DETAILED DESCRIPTION OF THE PREFERRED EMBODIMENT AND THE DRAWINGS

Referring now to the drawings wherein the showings are for the purpose of illustrating a preferred embodiment of the invention only and not for the purpose of limiting same, FIG. 1 shows a well drilling rig 10 comprised of a rotary boring bit 12 and a drill string 14 passing downwardly through a casing 16 which is located in a well bore hole 20 formed by the descending drilling rig 10. Drilling fluid passes vertically downwardly through the central bore 22 of the drill string 14 in the direction of arrows $A_1$. The drilling fluid exits near the boring bit 12 and passes upwardly in the direction of arrows $A_2$ within the well bore 20 and casing 16 to the earth's surface. The circulating drilling fluid acts to both cool and lubricate the boring bit 12 and also performs the function of a cleaning medium for removing drilling chips from the bore hole 20.

FIG. 1 also illustrates a lost circulation condition wherein the drilling rig 10 has passed through a porous fractured or vugular stratum 30 such as oil sand, shale or the like. Circulation of the drilling fluid is partially or totally lost into the stratum 30 as illustrated by the arrows $A_3$. This lost circulation condition is critical to further operation of the drilling rig 10 since large amounts of the coolant/lubricant/transport medium drilling fluid are being lost to the stratum 30 rather than performing its required functions.

In order to arrest or prevent this lost circulation condition which would otherwise substantially hinder or stop the further progress of the drilling operation, a pelleted lost circulation material in accordance with the present invention is added to the circulating drilling fluid. FIG. 2 illustrates one preferred form of such a lost circulation pellet 32. In accordance with the invention, the pellet comprises ground or shredded paper, preferably newsprint or magazines, which has been sprayed with water and a surfactant and compressed into the pellet 32. While the pellet 32 is shown as being a briquette in form, it will be understood that this form is merely a matter of manufacturing convenience and that any other shapes and sizes of pellet would function equally well. Thus, shape or size of the pellet 32 has no function in this invention insofar as a dispersible pellet is concerned.

FIG. 3 illustrates the use of the lost circulation pellets 32 in a drilling fluid to arrest the lost circulation condition shown in FIG. 1. The pellets 32 are preferrably added to the mud pit located on the surface adjacent the drilling rig. The pellets will partially or completely disperse within the drilling fluid in the mud pit prior to being pumped downwardly through the drill string 14 to the boring bit 12. In an alternative manner of use, the pellets 32 may be added directly to the circulating drilling fluid and pumped downwardly through the drill string 14 to the boring bit 12, the pellets completely or partially dispersing during their descent. By the time the pellets 32 have circulated to the boring bit 12, they are substantially disintegrated into wetted particulate paper 34 and are in condition for infiltrating and blocking the porous passages of the porous stratum 30. As more particulate paper 34 circulates, a mat or blocked layer 36 is formed near the bore hole surface 40 of the porous fractured or vugular stratum 30.

As mentioned previously, the pellets 32 may be used in conjunction with other lost circulation materials such as cork, mica, foil, plastic, hemp fibers, nut hulls, ground oysters shells, chicken feathers, popcorn, wood fibers, eggshells, chopped rubber tires, sawdust, paper, unginned cotton, cotton seed hulls, leather scraps or any other similar lost circulation material known in the art and any combinations thereof. Such additional materials may be added contemporaneously with pellets 32 to the drilling fluid or any of such materials may be used in making the pellet itself and compacted therewith so that a single lost circulation material performs a multitude of functions in the arresting or preventing of a lost circulation condition.

Following the building up of a blocking layer 36 of lost circulation material in the porous stratum 30, normal drilling fluid circulation in the directions of arrows $A_1$ and $A_2$ is restored and the drilling operation may continue.

In the manufacture of the pellets 32, paper, such as magazines or newsprint, are comminuted to produce paper wool fragments such as by grinding or hammermilling. Hammermilling using a ¼" screen has been found to be an effective means of producing the comminuted paper. This paper is then sprayed with a solution of water and surfactant and compacted under pressure to produce the desired pelleted form having a bulk density of at least 20 pounds per cubic foot.

The water content of the pellet 32 is generally in the range of about 5 to 25 percent by weight. Above about 25 percent the pellet is somewhat soggy and will not retain its shape. Below about 5 percent water, there is insufficient binding strength in the paper to hold the pellet together.

The surfactant used in the water solution for the pellet generally comprises at least about 0.1 percent by weight of the completed pellet. Although there is substantially no upper limit on the amount of surfactant used, economics dictate a limit of about 2 percent based on the total weight of pellet components as being preferred. The surfactant may be an anionic or non-ionic surfactant with the only limiting factors being that the selected surfactant must be compatible with established drilling fluid materials, water soluble and non-foaming. Such non-ionic surfactants as ethoxylated organics may be used, but the preferred surfactants are the lignin sulfonates since they are effective and inexpensive. Such materials are also already used in large quantities in many drilling fluids and therefore, are fully compatible with most drilling fluid systems.

As used in this specification, the term "water soluble" shall be understood to mean that the designated component is at least partially soluble in water. Total miscibility with water is not required within this definition of "water soluble".

The following examples will illustrate the preferred manufacture and composition of the lost circulation paper pellets 32 in accordance with the invention.

EXAMPLE I

In preparing pellets in accordance with the invention, paper is ground in one pass through a hammermill using a ¼" screen. screen. A 5 percent solution of sodium, chromium or calcium lignosulfonate is prepared and sprayed onto the ground paper which has been spread in a thin layer. Sufficient surfactant solution is used so that the resultant mixture is about 90 percent ground paper, about 9.5 percent water and about 0.5 percent surfactant. Pellets are then pressed from the moistened paper at both about 3,000 PSI and about 5,000 PSI. The material compressed at 3,000 PSI had a density of about 31.5 pounds per cubic foot while the 5,000 PSI compressed mixture had a density of 40.1 pounds per cubic foot. When placed in water both pellets dispersed at the same rate, being completely dispersed in about 2 minutes.

EXAMPLE II

The same ground paper prepared in the manner of Example I was combined in a 50/50 mixture with Aspen fiber to yield a uniform mix. The fibrous nature of the two components served to bind them together and prevent dropout. A surfactant solution prepared as in Example I, was then sprayed onto the paper/Aspen fiber mixture to yield a mixture which was about 45 percent paper, about 45 percent Aspen fiber, about 9.5 percent water and about 0.5 percent surfactant. When compacted at 5,000 PSI, the pellet had a density of about 34 pounds per cubic foot. The pellet dispersed rapidly in water to yield a mixture of the two components. A product of this type would find use in sealing larger spaces in a lost circulation stratum and also prevent seepage.

The composition of the preferred pellet 32 may also include additional such materials as biocides including paraformaldehyde and sodium pentachlorephenol; corrosion inhibitors including imidazolines, basic zinc carbonate and proprietary formulations; and/or viscosifiers such as hydroxy ethyl cellulose, xanthan gum and polyacrylamide resins. These materials may be sprayed with the water/surfactant solution or added separately to the mixture prior to compacting.

Other pellet formulations may include a 50/50% mix of paper and wood fiber, a 33/33/33% mix of paper, wood fiber and cottonseed hulls and a 75/25% mix of paper and walnut shells. Such mixtures provide a pellet with multiple blocking function in arresting or preventing a lost circulation condition. Another pellet formulation includes a bentonite viscosifier, fiberous bridging material (asbestos, wood fiber, etc.), cubic blocking material (oyster shells, cork, bark, etc.) and matting material (ground paper) which provides the industry with a single lost circulation additive to attack all aspects of a porous or vugular stratum.

While the invention has been described in the more limited aspects of preferred embodiment thereof, other embodiments have been suggested and still others will occur to those skilled in the art upon the reading and understanding of the foregoing specification. It is intended that all such embodiments be included within the scope of the invention as limited only by the appended claims.

I claim:

1. In a bore hole drilling method wherein an aqueous drilling fluid is employed which includes a lost circulation material for arresting fluid loss in porous earth strata, the improvement which comprises said lost circulation material comprising a compressed, water dispersible pellet of ground paper, about 5 to 25% by weight water, and at least about 0.1% by weight of a water soluble, non-foaming anionic or nonionic surfactant and wherein said pellet has a bulk density of at least 20 pounds per cubic foot.

2. The method as set forth in claim 1 wherein said pellet further includes a fibrous material.

3. The method as set forth in claim 2 wherein said fibrous material is selected from a group consisting of asbestos fibers, wood fibers, cane fibers and straw.

4. The method as set forth in claim 2 wherein said fibrous material comprises up to about 50% of said pellet relative to the weight of said ground paper.

5. The method as set forth in claim 1 wherein said surfactant is selected from a group consisting of nonionic and anionic surfactants.

6. The method as set forth in claim 1 wherein said pellet further includes a biocide.

7. The method as set forth in claim 1 wherein said pellet further includes a corrosion inhibitor.

8. The method as set forth in claim 1 wherein said pellet further includes a viscosifier.

9. The method as set forth in claim 1 wherein said pellet comprises, by weight 90% ground newsprint, 0.5% surfactant and 9.5% water.

10. The method as set forth in claim 9 wherein ground newsprint is formed by hammermilling using a $\frac{1}{4}''$ screen.

11. The method as set forth in claim 1 wherein said pellet is compressed at about 5,000 PSI.

12. The method as set forth in claim 1 wherein said ground paper comprises ground newsprint.

13. A method of forming a lost circulation material for use in drilling fluids comprising comminuting paper to produce particulate paper, combining said particulate paper with a solution of water and a water soluble, non-foaming anionic or nonionic surfactant, and compressing said combined particulate paper, water and surfactant to produce a pelletized lost circulation material wherein said pelletized lost circulation material has a bulk density of at least 20 pounds per cubic foot and comprises paper, about 5 to 25% by weight water, and at least about 0.1% by weight surfactant.

14. The method as set forth in claim 13 wherein the step of comminuting comprises hammermilling said paper.

15. The method as set forth in claim 13 wherein said step of compressing comprises compressing said mixture at about 3,000 to about 5,000 PSI.

* * * * *